(12) United States Patent
Morimoto et al.

(10) Patent No.: US 9,593,588 B2
(45) Date of Patent: Mar. 14, 2017

(54) SHAFT SEAL MECHANISM

(71) Applicant: MITSUBISHI HEAVY INDUSTRIES, LTD., Tokyo (JP)

(72) Inventors: Hitoshi Morimoto, Tokyo (JP); Keizo Tsukagoshi, Tokyo (JP); Junichiro Masada, Tokyo (JP); Tatsuji Takahashi, Tokyo (JP); Masato Araki, Tokyo (JP); Tanehiro Shinohara, Tokyo (JP); Hidekazu Uehara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 902 days.

(21) Appl. No.: 13/772,873

(22) Filed: Feb. 21, 2013

(65) Prior Publication Data

US 2013/0230393 A1 Sep. 5, 2013

(30) Foreign Application Priority Data

Feb. 25, 2011 (JP) ................................. 2011-040372

(51) Int. Cl.
*F01D 11/02* (2006.01)
*F16J 15/3288* (2016.01)
*F04D 29/10* (2006.01)
*F16J 15/32* (2016.01)

(52) U.S. Cl.
CPC .............. *F01D 11/02* (2013.01); *F04D 29/10* (2013.01); *F04D 29/102* (2013.01); *F16J 15/3288* (2013.01); *F05D 2240/57* (2013.01); *F05D 2250/75* (2013.01)

(58) Field of Classification Search
CPC ... F16J 15/3288; F01D 11/003; F01D 25/183; F04D 29/102; F04D 29/106
USPC .......................... 277/355, 411, 412; 415/230
See application file for complete search history.

(56) References Cited

U.S. PATENT DOCUMENTS

| 6,457,719 | B1 * | 10/2002 | Fellenstein | .......... | F16J 15/3288 |
| | | | | | 277/355 |
| 7,066,468 | B2 * | 6/2006 | Uehara | ................ | F16J 15/3292 |
| | | | | | 277/355 |
| 7,413,194 | B2 * | 8/2008 | Wright | ................. | F16J 15/3288 |
| | | | | | 277/355 |

(Continued)

FOREIGN PATENT DOCUMENTS

| JP | 2002-71027 A | 3/2002 |
| JP | 3616016 B2 | 2/2005 |
| JP | 2010-522297 A | 7/2010 |

OTHER PUBLICATIONS

Decision to Grant a Patent dated Jan. 6, 2015, issued in corresponding Japanese Patent Application No. 2011-040372. Explanation of Relevance "The Decision to Grant a Patent has been received." (3 pages).

(Continued)

*Primary Examiner* — Alexander Comley
(74) *Attorney, Agent, or Firm* — Westerman, Hattori, Daniels & Adrian, LLP (57) ABSTRACT

An inner wall surface of a low-pressure-side side plate opposite to a lateral surface of a thin plate is formed along a direction crossing an axial direction of a rotating shaft such that a gap between the inner wall surface and the thin plate gradually decreases from a radially inner side toward a radially outer side of the low-pressure-side side plate.

9 Claims, 6 Drawing Sheets

(56) References Cited

U.S. PATENT DOCUMENTS

| | | | | |
|---|---|---|---|---|
| 7,976,026 | B2* | 7/2011 | Verma | F01D 11/00 |
| | | | | 277/355 |
| 8,025,296 | B2* | 9/2011 | Uehara | F01D 11/00 |
| | | | | 277/355 |
| 8,162,323 | B2* | 4/2012 | Nicholson | F16J 15/3292 |
| | | | | 277/355 |
| 8,231,340 | B2* | 7/2012 | Howes | F01D 11/00 |
| | | | | 277/355 |
| 2006/0210392 | A1* | 9/2006 | Enderby | F16J 15/3288 |
| | | | | 415/170.1 |
| 2007/0102886 | A1* | 5/2007 | Uehara | F01D 11/00 |
| | | | | 277/355 |
| 2009/0309311 | A1* | 12/2009 | Verma | F01D 11/00 |
| | | | | 277/411 |
| 2009/0322035 | A1* | 12/2009 | Wright | F01D 11/003 |
| | | | | 277/431 |
| 2010/0032908 | A1* | 2/2010 | Bowsher | F16J 15/44 |
| | | | | 277/411 |

OTHER PUBLICATIONS

Japanese Office Action dated Jun. 3, 2014, issued in Japanese Patent Application No. 2011-040372 with English translation (12 pages).

* cited by examiner

SHAFT SEAL MECHANISM

TECHNICAL FIELD

The present invention relates to a shaft seal mechanism preferably used for, for example, a rotating shaft of a large-sized fluid machine such as a gas turbine, a steam turbine, a compressor, or a pump. The present invention relates to a turbine that transduces the thermal, energy of fluid into mechanical rotational energy to generate power, and in particular, to a shaft seal mechanism applied to the rotating shaft.

BACKGROUND ART

In general, a gas turbine, a steam turbine, and the like include a shaft seal mechanism provided around a rotating shaft in order to reduce the amount of gas leaking from a high pressure side to a low pressure side. An example of the shaft seal mechanism is a mechanism called a leaf seal and including flat thin plates (called "leaves") arranged in multiple layers in a circumferential direction of the rotating shaft and having a predetermined width dimension in the axial direction of the rotating shaft (see, for example, PTL 1, which is hereby incorporated by reference herein in its entirety). A leaf seal housing is also known as a cover for the leaf seal. The leaf seal housing is also called a leaf seal casing.

CITATION LIST

Patent Literature (PTL 1)
The Publication of Japanese Patent No. 3616016

SUMMARY OF INVENTION

Technical Problem

Abrasion of the leaf seal is caused by variation in the amount of residual pressure (the amount of radially inward indentation, that is, indentation toward the rotating shaft) on the thin plates (leaves) and disturbance of pressure distribution around each of the thin plates.

The amount of residual pressure on the thin plate can be adjusted during manufacture and assembly. Thus, it is very unlikely that the thin plate is worn away due to variation in the amount of residual pressure on the thin plate.

On the other hand, the pressure distribution around the thin plate is adjusted by a low-pressure-side gap shown by reference numeral 31 in FIG. 13 of PTL 1. This reduces the abrasion of the thin plate associated with the pressure distribution around the thin plate.

However, a gap (low-pressure-side gap) 31 between a thin plate 29 and a low-pressure-side side plate 26 may suffer from a problem. That is, the leaf seal may be inclined to the axial direction of the rotating shaft due to manufacturing errors and assembly errors in components of the leaf seal. This precludes the predetermined low-pressure-side gap 31 from being maintained, causing disturbance of the pressure distribution around the thin plate. The disturbance of the pressure distribution around the thin plate causes the thin plate to be more significantly worn away.

An object of the present invention is to maintain appropriate pressure distribution around the thin plate when the leaf seal is inclined to the axial direction of the rotating shaft due to manufacturing errors and assembly errors in components of the leaf seal. Another object of the present invention is to prevent the thin plate from being worn away as a result of disturbance of the pressure distribution around the thin plate.

Solution to Problem

A shaft seal mechanism according to the present invention is a shaft seal mechanism blocking fluid flowing through an annular space between a rotating shaft and a stationary portion in an axial direction of the rotating shaft, the shaft seal mechanism including a leaf seal housing held inside the stationary portion, a plurality of thin plates provided in a circumferential direction of the rotating shaft with gaps formed between the thin plates, wherein each of the thin plates includes an outer circumferential base end fixed in the leaf seal housing and an inner circumferential leading end subtending an acute angle to a circumferential surface of the rotating shaft, having a width in the axial direction of the rotating shaft and contacting the circumferential surface of the rotating shaft in a slidable manner, and a low-pressure-side side plate and a high-pressure-side side plate provided on a low pressure side and a high pressure side, respectively, of the leaf seal housing, sandwiching each of the plurality of thin plates between the side plates, wherein an inner wall surface of the low-pressure-side side plate opposite to a lateral surface of the thin plate is formed along a direction crossing the axial direction of the rotating shaft such that a gap between the inner wall surface and the thin plate gradually decreases from a radially inner side toward a radially outer side of the low-pressure-side side plate.

The shaft seal mechanism according to the present invention allows an appropriate gap (low-pressure-side gap) to be formed between the thin plate and the low-pressure-side side plate even if the shaft seal mechanism is inclined to the axial direction of the rotating shaft due to manufacturing errors and assembly errors in the components.

Thus, appropriate pressure distribution can be maintained around the thin plate even if the shaft seal mechanism is inclined to the axial direction of the rotating shaft due to manufacturing errors and assembly errors in the components. This allows the thin plate to be prevented from being worn away as a result of possible disturbance of the pressure distribution around the thin plate.

In an aspect of the shaft seal mechanism, the inner wall surface of the low-pressure-side side plate and an outer wall surface of the low-pressure-side side plate are connected together by a rounded curved surface projecting toward the inner circumferential leading end of the thin plate.

Such a shaft seal mechanism eliminates a corner formed by the inner wall surface and an inner circumferential surface to allow the inner wall surface and the outer wall surface to be connected together by the smooth curved surface.

Thus, possible contact of the thin plate with the corner formed by the inner wall surface and the inner circumferential surface can be avoided even if the shaft seal mechanism is inclined to the axial direction of the rotating shaft due to manufacturing errors and assembly errors in the components. Furthermore, possible damage to the thin plate inflicted by the corner can be avoided.

In the shaft seal mechanism, the inner wall surface of the low-pressure-side side plate and the outer wall surface of the low-pressure-side side plate may be arranged along the circumferential direction of the rotating shaft and may be connected with each other through a communication hole extending along the axial direction of the rotating shaft.

In some cases, appropriate pressure distribution cannot be formed around the thin plate simply by inclining the inner wall surface because a sufficient inclination angle of the inner wall surface cannot be obtained (for example, the inner wall surface cannot be inclined through a large angle), and the shaft seal mechanism is inclined to the axial direction of the rotating shaft due to manufacturing errors and assembly errors in the components. Even in such cases, the shaft seal mechanism as described above allows the inner wall surface of the low-pressure-side side plate and the outer wall surface of the low-pressure-side side plate to be connected with each other through the communication hole to enable appropriate pressure distribution to be formed around the thin plate.

A shaft seal mechanism according to the present invention is a shaft seal mechanism blocking fluid flowing through an annular space between a rotating shaft and a stationary portion in an axial direction of the rotating shaft, the shaft seal mechanism including a leaf seal housing held inside the stationary portion, a plurality of thin plates provided in a circumferential direction of the rotating shaft with gaps formed between the thin plates, wherein each of the thin plates includes an outer circumferential base end fixed in the leaf seal housing and an inner circumferential leading end subtending an acute angle to a circumferential surface of the rotating shaft, having a width in the axial direction of the rotating shaft and contacting the circumferential surface of the rotating shaft in a slidable manner, and a low-pressure-side side plate and a high-pressure-side side plate provided on a low pressure side and a high pressure side, respectively, of the leaf seal housing, sandwiching each of the plurality of thin plates between the side plates, wherein an inner wall surface of the low-pressure-side side plate opposite to a lateral surface of the thin plate is configured to form, between the inner wall surface and the thin plate, a gap that is constant from a radially inner side toward a radially outer side of the low-pressure-side side plate along a direction orthogonal to the axial direction of the rotating shaft, an inner circumferential surface of the low-pressure-side side plate opposite to the circumferential surface of the rotating shaft is configured to form a constant gap between the inner circumferential surface and the circumferential surface of the rotating shaft along the axial direction of the rotating shaft, and the inner wall surface of the low-pressure-side side plate and an outer wall surface of the low-pressure-side side plate are connected with each other through a slit engraved in an inner circumferential surface of the low-pressure-side side plate along a circumferential direction and the axial direction of the rotating shaft.

The shaft seal mechanism according to the present invention allows the inner wall surface of the low-pressure-side side plate and the outer wall surface of the low-pressure-side side plate to be connected with each other through the slit to form appropriate pressure distribution around the thin plate even if the shaft seal mechanism is inclined to the axial direction of the rotating shaft due to manufacturing errors and assembly errors in the components.

Thus, appropriate pressure distribution can be maintained around the thin plate even if the shaft seal mechanism is inclined to the axial direction of the rotating shaft due to manufacturing errors and assembly errors in the components. This allows the thin plate to be prevented from being worn away as a result of possible disturbance of the pressure distribution around the thin plate.

A shaft seal mechanism according to the present invention is a shaft seal mechanism blocking fluid flowing through an annular space between a rotating shaft and a stationary portion in an axial direction of the rotating shaft, the shaft seal mechanism including a leaf seal housing held inside the stationary portion, a plurality of thin plates provided in a circumferential direction of the rotating shaft with gaps formed between the thin plates, wherein each of the thin plates includes an outer circumferential base end fixed in the leaf seal housing and an inner circumferential leading end subtending an acute angle to a circumferential surface of the rotating shaft, the thin plate having a width in the axial direction of the rotating shaft and contacting the circumferential surface of the rotating shaft in a slidable manner, and a low-pressure-side side plate and a high-pressure-side side plate provided on a low pressure side and a high pressure side, respectively, of the leaf seal housing, sandwiching each of the plurality of thin plates between the side plates, wherein an inner wall surface of the low-pressure-side side plate opposite to a lateral surface of the thin plate is configured to form, between the inner wall surface and the thin plate, a gap that is constant from a radially inner side toward a radially outer side of the low-pressure-side side plate along a direction orthogonal to the axial direction of the rotating shaft, an inner circumferential surface of the low-pressure-side side plate opposite to the circumferential surface of the rotating shaft is configured to form a constant gap between the inner circumferential surface and the circumferential surface of the rotating shaft along the axial direction of the rotating shaft, and the inner wall surface of the low-pressure-side side plate and an outer wall surface of the low-pressure-side side plate are arranged along a circumferential direction of the rotating shaft and are connected with each other through a communication hole extending along the axial direction of the rotating shaft.

The shaft seal mechanism according to the present invention allows the inner wall surface of the low-pressure-side side plate and the outer wall surface of the low-pressure-side side plate to be connected with each other through the communication hole to form appropriate pressure distribution around the thin plate even if the shaft seal mechanism is inclined to the axial direction of the rotating shaft due to manufacturing errors and assembly errors in the components.

Thus, appropriate pressure distribution can be maintained around the thin plate even if the shaft seal mechanism is inclined to the axial direction of the rotating shaft due to manufacturing errors and assembly errors in the components. This allows the thin plate to be prevented from being worn away as a result of possible disturbance of the pressure distribution around the thin plate.

A shaft seal mechanism according to the present invention is a shaft seal mechanism blocking fluid flowing through an annular space between a rotating shaft and a stationary portion in an axial direction of the rotating shaft, the shaft seal mechanism including a leaf seal housing held inside the stationary portion, a plurality of thin plates provided in a circumferential direction of the rotating shaft with gaps formed between the thin plates, wherein each of the thin plates includes an outer circumferential base end fixed in the leaf seal housing and an inner circumferential leading end subtending an acute angle to a circumferential surface of the rotating shaft, having a width in the axial direction of the rotating shaft and contacting the circumferential surface of the rotating shaft in a slidable manner, and a low-pressure-side side plate and a high-pressure-side side plate provided on a low pressure side and a high pressure side, respectively, of the leaf seal housing, sandwiching the plurality of thin plates between the side plates, wherein an inner wall surface of the low-pressure-side side plate opposite to a lateral surface of the thin plate is configured to form, between the inner wall surface and the thin plate along a direction orthogonal to the axial direction of the rotating shaft, a gap that is constant from a radially inner side toward a radially outer side of the low-pressure-side side plate, an inner circumferential surface of the low-pressure-side side plate opposite to the circumferential surface of the rotating shaft is configured to form a constant gap between the inner circumferential surface and the circumferential surface of the rotating shaft along the axial direction of the rotating shaft, and a surface of the inner wall surface of the low-pressure-side side plate is processed to have high degree of roughness in the surface.

The shaft seal mechanism according to the present invention allows an appropriate gap (low-pressure-side gap) to be formed between the thin plate and the low-pressure-side side plate even if the shaft seal mechanism is inclined to the axial direction of the rotating shaft due to manufacturing errors and assembly errors in the components.

Thus, appropriate pressure distribution can be maintained around the thin plate even if the shaft seal mechanism is inclined to the axial direction of the rotating shaft due to manufacturing errors and assembly errors in the components. This allows the thin plate to be prevented from being worn away as a result of possible disturbance of the pressure distribution around the thin plate.

A turbine according to the present invention is a turbine transducing thermal energy of fluid into mechanical rotational energy to generate power by guiding the fluid at elevated temperature and pressure to a casing to blow the fluid against a blade on a rotating shaft rotatably supported inside the casing, including any of the above-described shaft seal mechanisms.

The turbine according to the present invention includes the shaft seal mechanism that can maintain appropriate pressure distribution around the thin plate even if the shaft seal mechanism is inclined to the axial direction of the rotating shaft due to manufacturing errors and assembly errors in the components, allowing the thin plate to be prevented from being worn away as a result of possible disturbance of the pressure distribution around the thin plate.

This enables the amount of leaking gas to be kept small over a long time and thus enables to reduce loss of driving force caused by gas leakage.

Advantageous Effects of Invention

An advantageous effect of the present invention is that appropriate pressure distribution can be maintained around the thin plate in the housing mechanism even if the shaft seal mechanism is inclined to the axial direction of the rotating shaft due to manufacturing errors and assembly errors in the components. This allows the thin plate to be prevented from being worn away as a result of possible disturbance of the pressure distribution around the thin plate.

DESCRIPTION OF EMBODIMENTS

First Embodiment

A shaft seal mechanism according to a first embodiment of the present invention will be described with reference to FIG. 1 to FIG. 3.

Figure 1:
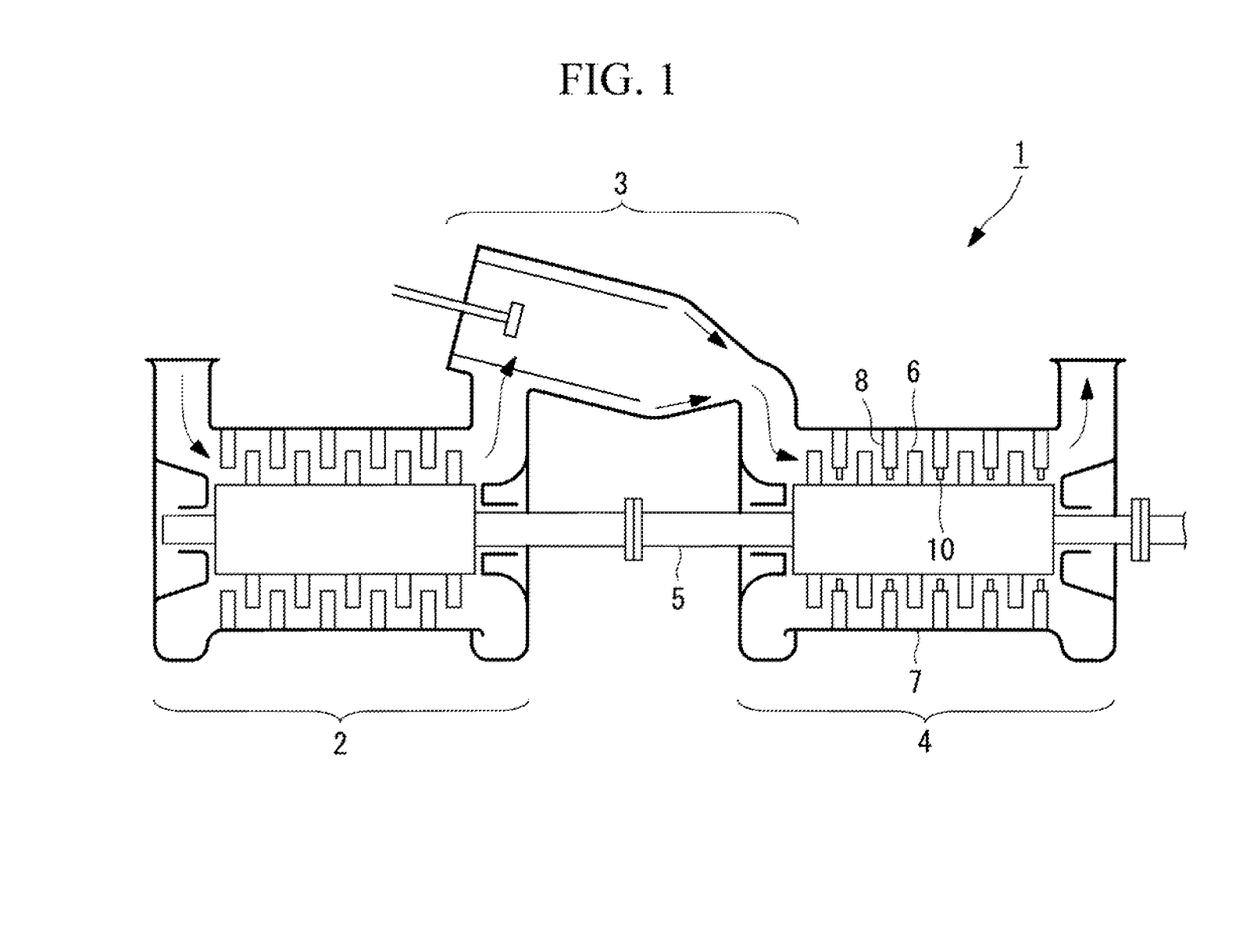
FIG. 1 is a schematic diagram showing a specific example in which a shaft seal mechanism according to the present invention is applied to a gas turbine (fluid machine).

FIG. 1 is a schematic diagram showing a specific example in which the shaft seal mechanism according to the present invention is applied to a gas turbine (fluid machine). FIG. 2 is a cross-sectional view of a structure of the shaft seal mechanism according to the present embodiment installed in a stator, wherein the cross section contains an axis of a rotating shaft. FIG. 3 is an enlarged diagram showing an important part of FIG. 2.

As shown in FIG. 1, the gas turbine 1 includes a compressor 2, a combustor 3, and a turbine 4.

The compressor 2 suctions and compresses a large amount of air. The gas turbine 1 normally utilizes part of power exerted by a rotating shaft (rotor) 5 described below as power for the compressor 2.

The combustor 3 mixes fuel into air compressed by the compressor 2 and combusts the mixture.

The turbine 4 brings combustion gas generated in the combustor 3 into the turbine 4 and expands and blows the combustion gas against blades 6 provided on the rotating shaft 5, thus transducing the thermal energy of the combustion gas into mechanical rotational energy to generate power.

In addition to the plurality of blades 6 arranged on the rotating shaft 5 side, the turbine 4 includes a plurality of vanes (stationary portion) 8 arranged on a stator 7 side. The rotor blades 6 and vanes 8 are alternately arranged in the axial direction of the rotating shaft 5. The blades 6 are subjected to the pressure of combustion gas flowing in the axial direction of the rotating shaft 5 to rotate the rotating shaft 5 so that rotational energy exerted on the rotating shaft can be taken out from an axial end and utilized for a certain purpose. A shaft seal mechanism (also referred to as a "leaf seal") 10 is provided between each of the vanes 8 and the rotating shaft 5 in order to reduce the amount of combustion gas leaking from a high-pressure-side area to a low-pressure-side area through an annular space shown in FIG. 2.

Figure 2:
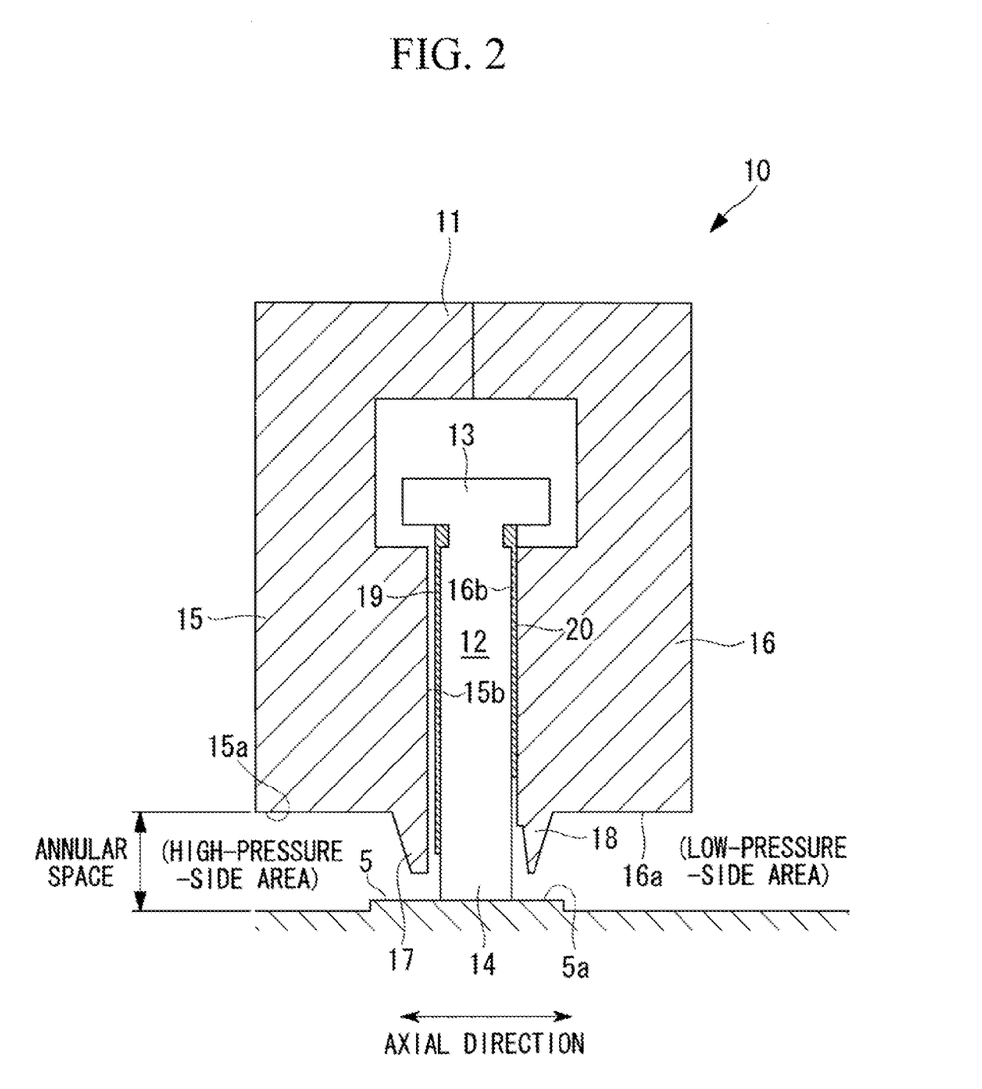
FIG. 2 is a cross-sectional view of a structure of a shaft seal mechanism according to a first embodiment of the present invention installed in a stator, wherein the cross section contains an axis of a rotating shaft.

As shown in FIG. 2, the shaft seal mechanism 10 according to the present embodiment is disposed between the rotating shaft 5 and the vane 8 along a circumferential direction of the rotating shaft 5. The shaft seal mechanism 10 includes a leaf seal housing (leaf seal ring) 11 held inside the vane 8 (see FIG. 1) and a plurality of thin plates 12 provided in the circumferential direction of the rotating shaft 5 with gaps formed between the thin plates 12.

The thin plate 12 is a thin-plate-like member appearing to have a T shape in a front view and including an outer circumferential base end 13 fixed in the leaf seal housing 11 and an inner circumferential leading end 14 subtending an acute angle to a circumferential surface 5a of the rotating shaft 5. The thin plate 12 is disposed so as to have a width along the axial direction of the rotating shaft 5 and to contact the circumferential surface 5a of the rotating shaft 5 in a slidable manner. Furthermore, the thin plate 12 has a predetermined stiffness in the axial direction of the rotating shaft 5 which is determined by a plate thickness and also has flexibility in the circumferential direction of the rotating shaft 5.

The leaf seal housing 11 is an annular member that sandwiches each of the plurality of thin plates 12 between a high pressure side and a low pressure side thereof. The leaf seal housing 11 has a two-piece structure including a high-pressure-side housing 15 disposed on the high pressure side and a low-pressure-side housing 16 disposed on the low pressure side.

The high-pressure-side housing 15 includes a high-pressure-side side plate 17 located along the circumferential direction of the rotating shaft 5 and projecting from an inner circumferential surface 15a toward the circumferential surface 5a of the rotating shaft 5. The high-pressure-side side plate 17 serves as a guide plate for a pressure acting direction.

Furthermore, the low-pressure-side housing 16 includes a low-pressure-side side plate 18 located along the circumferential direction of the rotating shaft 5 and projecting from an inner circumferential surface 16a toward the circumferential surface 5a of the rotating shaft 5. The low-pressure-side side plate 18 serves as a guide plate for a pressure acting direction.

Reference numeral 19 in FIG. 2 denotes a high-pressure-side plate shaped like a ring segment and sandwiched between the high-pressure-side housing 15 and one lateral edge of the thin plate 12 located opposite the high-pressure-side area so as to contact the one lateral edge of the thin plate 12. Reference numeral 20 in FIG. 2 denotes a low-pressure-side plate shaped like a ring segment and sandwiched between the low-pressure-side housing 16 and the other lateral edge of the thin plate 12 located opposite the low-pressure-side area so as to contact the other lateral edge of the thin plate 12.

Figure 3:
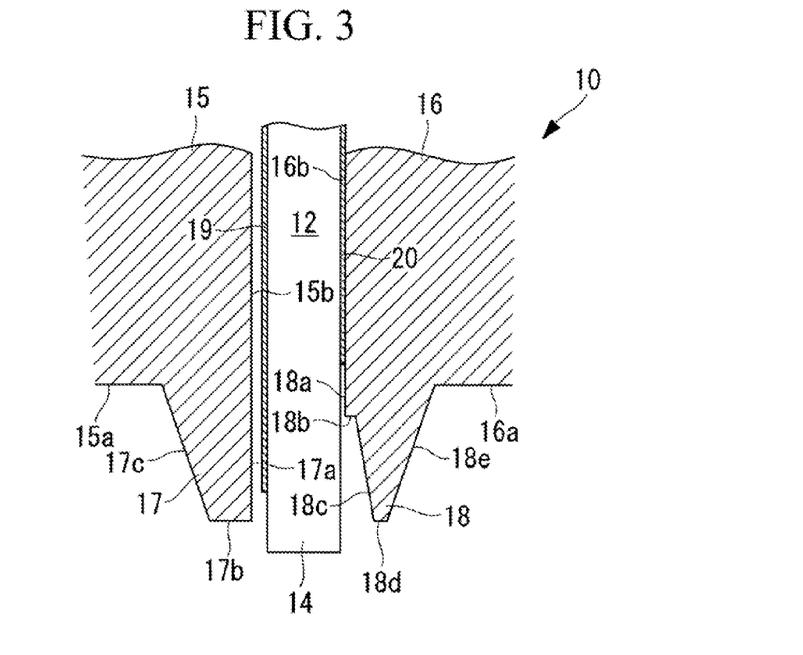
FIG. 3 is an enlarged diagram showing an important part of FIG. 2.

As shown in FIG. 3, the high-pressure-side side plate 17 is formed by an inner wall surface 17a, an inner circumferential surface 17b, and an outer wall surface (inclined surface) 17c.

The inner wall surface 17a extends along the circumferential direction of the rotating shaft 5 and along a direction orthogonal to the axial direction of the rotating shaft 5 so as to lie in the same plane with the inner wall surface 15b of the high-pressure-side housing 15 which is opposite to the inner wall surface 16b of the low-pressure-side housing 16.

The inner circumferential surface 17b extends along the circumferential direction of the rotating shaft 5 and along the axial direction of the rotating shaft 5 so as to lie parallel to the circumferential surface 5a of the rotating shaft 5.

The outer wall surface 17c extends along the circumferential direction of the rotating shaft 5 and along the direction crossing the axial direction of the rotating shaft 5 so that the high-pressure-side side plate 17 broadens from a leading end thereof (the end opposite to the circumferential surface 5a of the rotating shaft 5) to a base end thereof (the end connected to the high-pressure-side housing 15), that is, the plate thickness (lateral length in FIG. 3) of the high-pressure-side side plate 17 gradually increases.

Furthermore, the inner wall surface 17a and the inner circumferential surface 17b are continuously connected together. The inner circumferential surface 17b and the outer wall surface 17c are continuously connected together. The outer wall surface 17c and the inner circumferential surface 15a are continuously connected together.

The low-pressure-side side plate 18 is formed by a (first) inner wall surface 18a, a (first) inner circumferential surface 18b, a (second) inner wall surface (tapered surface: inclined surface) 18c, a (second) inner circumferential surface 18d, and an outer wall surface (inclined surface) 18e.

The inner wall surface 18a extends along the circumferential direction of the rotating shaft 5 and along the direction orthogonal to the axial direction of the rotating shaft 5 so as to lie in the same plane with the inner wall surface 16b of the low-pressure-side housing 16 which is opposite to the inner wall surface 15b of the high-pressure-side housing 15.

The inner circumferential surface 18b extends along the circumferential direction of the rotating shaft 5 and along the axial direction of the rotating shaft 5 so as to lie parallel to the circumferential surface 5a of the rotating shaft 5.

The inner wall surface 18c extends along the circumferential direction of the rotating shaft 5 and along the direction crossing the axial direction of the rotating shaft 5 so that the low-pressure-side side plate 18 broadens from a leading end thereof (the end opposite to the circumferential surface 5a of the rotating shaft 5) to a base end thereof (the end connected to the inner circumferential surface 18b), that is, the plate thickness (lateral length in FIG. 3) of the low-pressure-side side plate 18 gradually increases, in other words, the gap between the low-pressure-side side plate 18 and the thin plate 12 gradually decreases.

The inner circumferential surface 18d extends along the circumferential direction of the rotating shaft 5 and along the axial direction of the rotating shaft 5 so as to lie parallel to the circumferential surface 5a of the rotating shaft 5.

The outer wall surface 18e extends along the circumferential direction of the rotating shaft 5 and along the direction crossing the axial direction of the rotating shaft 5 so that the low-pressure-side side plate 18 broadens from a leading end thereof (the end opposite to the circumferential surface 5a of the rotating shaft 5) to a base end thereof (the end connected to the low-pressure-side housing 16), that is, the plate thickness (lateral length in FIG. 3) of the low-pressure-side side plate 18 gradually increases.

Furthermore, the inner wall surface 18a and the inner circumferential surface 18b are continuously connected together. The inner circumferential surface 18b and the inner wall surface 18c are continuously connected together. The inner wall surface 18c and the inner circumferential surface 18d are continuously connected together. The inner circumferential surface 18d and the outer wall surface 18e are continuously connected together. The inner wall surface 18c, the inner circumferential surface 18d, and the outer wall surface 18e form a shape appearing like a wedge in a cross-sectional view.

The shaft seal mechanism 10 according to the present embodiment allows an appropriate gap (low-pressure-side gap) to be formed between the thin plate 12 and the low-pressure-side side plate 18 even if the shaft seal mechanism 10 is inclined to the axial direction of the rotating shaft 5 due to manufacturing errors and assembly errors in the components.

Thus, appropriate pressure distribution can be maintained around the thin plate 12 even if the shaft seal mechanism 10 is inclined to the axial direction of the rotating shaft 5 due to manufacturing errors and assembly errors in the components. This allows the thin plate 12 to be prevented from being worn away as a result of possible disturbance of the pressure distribution around the thin plate 12.

Second Embodiment

A shaft seal mechanism according to a second embodiment of the present invention will be described with reference to FIG. 4.

Figure 4:
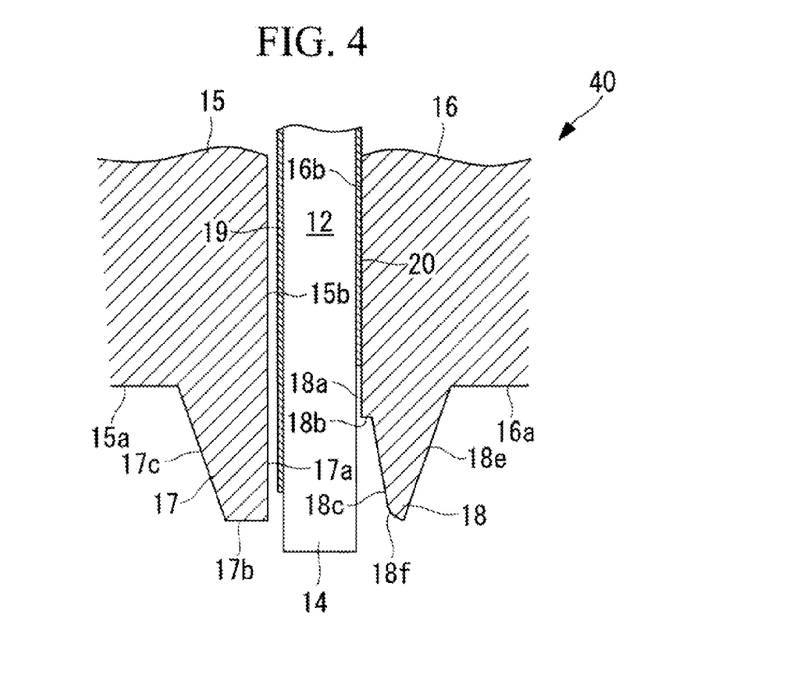
FIG. 4 is a cross-sectional view showing an important part of a shaft seal mechanism according to a second embodiment of the present invention, and is similar to FIG. 2.

FIG. 4 is an enlarged cross-sectional view showing an important part of the shaft seal mechanism according to the present embodiment, and is similar to FIG. 2.

As shown in FIG. 4, a shaft seal mechanism 40 according to the present embodiment is different from the shaft seal mechanism according to the first embodiment in that a curved surface (R curve) 18f is provided instead of the inner circumferential surface 18d. The other components of the shaft seal mechanism 40 are the same as the corresponding components of the above-described first embodiment and will thus not be described below.

The same components of the shaft seal mechanism 40 as the corresponding components of the first embodiment are denoted by the same reference numerals and will not be described below.

The curved surface 18f is a rounded surface projecting toward the inner circumferential leading end 14 of the thin plate 12 (at a constant radius of curvature). This eliminates a corner formed by the inner wall surface 13c and the inner circumferential surface 18d, allowing the inner wall surface 18c and the outer wall surface 18e to be smoothly connected together.

The shaft seal mechanism 40 according to the present embodiment eliminates the corner formed by the inner wall surface 18c and the inner circumferential surface 18d, allowing the inner wall surface 18c and the outer wall surface 18e to be connected together by the smooth curved surface 18f.

Thus, possible contact of the thin plate 12 with the corner formed by the inner wall surface 18c and the inner circumferential surface 18d can be avoided even if the shaft seal mechanism is inclined to the axial direction of the rotating shaft 5 due to manufacturing errors and assembly errors in the components. Furthermore, possible damage to the thin plate 12 inflicted by the corner can be avoided.

The other effects are the same as the effects of the above-described first embodiment and will not be described herein.

Third Embodiment

A shaft seal mechanism according to a third embodiment of the present invention will be described with reference to FIG. 5.

Figure 5:
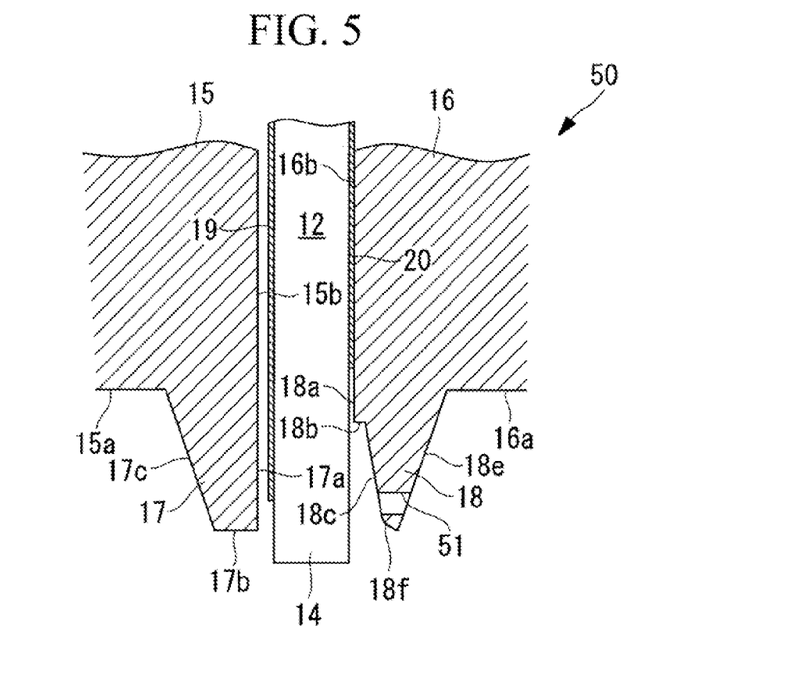
FIG. 5 is a cross-sectional view showing an important part of a shaft seal mechanism according to a third embodiment of the present invention, and is similar to FIG. 2.

FIG. 5 is an enlarged cross-sectional view showing an important part of the shaft seal mechanism according to the present embodiment, and is similar to FIG. 2.

As shown in FIG. 5, a shaft seal mechanism 50 according to the present embodiment is different from the shaft seal mechanisms of the above-described embodiments in that a plurality of communication holes (balance holes) 51 allowing the inner wall surface 18c and the outer wall surface 18e to be connected with each other are formed along the circumferential direction and axial direction of the rotating shaft 5. The other components of the shaft seal mechanism 50 are the same as the corresponding components of the above-described embodiments and will thus not be described below.

The same components of the shaft seal mechanism 50 as the corresponding components of the above-described embodiments are denoted by the same reference numerals and will not be described below. Furthermore, FIG. 5 shows the above-described second embodiment to which the communication holes 51 according to the present embodiment are applied.

In some cases, appropriate pressure distribution cannot be formed around the thin plate 12 simply by inclining the inner wall surface 18c because a sufficient inclination angle of the inner wall surface 18c cannot be formed (for example, the inner wall surface 18c cannot be inclined through a large angle), and the shaft seal mechanism is inclined to the axial direction of the rotating shaft 5 due to manufacturing errors and assembly errors in the components. Even in such cases, the shaft seal mechanism 50 according to the present embodiment allows the inner wall surface 18c of the low-pressure-side side plate 18 and the outer wall surface 18e of the low-pressure-side side plate 18 to be connected with each other through the communication holes 51 to enable appropriate pressure distribution to be formed around the thin plate 12.

The other effects are the same as the effects of the above-described second embodiment and will not be described herein.

Fourth Embodiment

A shaft seal mechanism according to a fourth embodiment of the present invention will be described with reference to FIG. 6 and FIG. 7.

Figure 6:
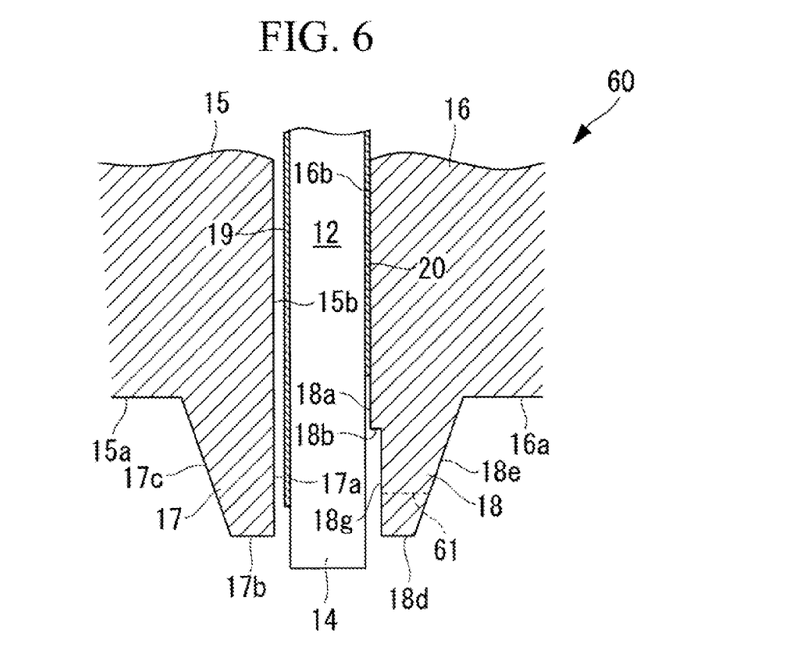
FIG. 6 is a cross-sectional view showing an important part of a shaft seal mechanism according to a fourth embodiment of the present invention, and is similar to FIG. 2.

FIG. 6 is an enlarged cross-sectional view of an important part of the shaft seal mechanism according to the present embodiment, and is similar to FIG. 2. FIG. 7 is a diagram of the outer wall surface of the low-pressure-side side plate as viewed along the axial direction of the rotating shaft.

Figure 7:
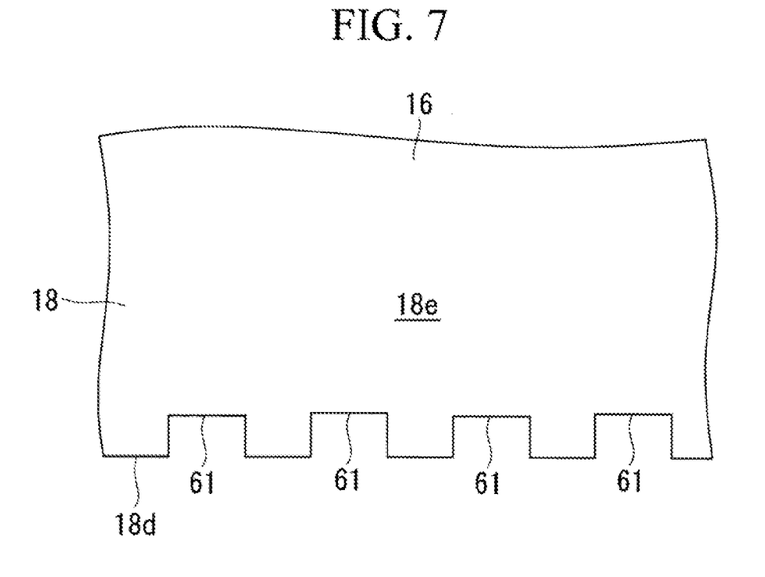
FIG. 7 is a diagram of an outer wall surface of a low-pressure-side side plate shown in FIG. 6 as viewed along an axial direction of the rotating shaft.

As shown in FIG. 6 or FIG. 7, a shaft seal mechanism 60 according to the present embodiment is different from the shaft seal mechanism according to the above-described first embodiment in that an inner wall surface 18g is provided instead of the inner wall surface 18c and that a slit 61 is formed in the inner circumferential surface 18d. The other components of the shaft seal mechanism 60 are the same as the corresponding components of the above-described first embodiment and will thus not be described below.

The same components of the shaft seal mechanism 60 as the corresponding components of the above-described first embodiment are denoted by the same reference numerals and will not be described below.

The inner wall surface 18g extends along the circumferential direction of the rotating shaft 5 and along the direction orthogonal to the axial direction of the rotating shaft 5 to lie parallel to the inner wall surface 16b of the low-pressure-side housing 16 which is opposite to the inner wall surface 15b of the high-pressure-side housing 15.

Furthermore, the inner circumferential surface 18b and the inner wall surface 18g are continuously connected together. The inner wall surface 18g and the inner circumferential surface 18d are continuously connected together.

A plurality of the slits 61 are formed in the inner circumferential surface 18d by being engraved from the inner circumferential surface 18d toward the inner circumferential surface 18b along the circumferential direction and axial direction of the rotating shaft 5 so as to allow the inner wall surface 18g and the outer wall surface 18e to be connected with each other.

The shaft seal mechanism 60 according to the present embodiment allows the inner wall surface 18g of the low-pressure-side side plate 18 and the outer wall surface 18e of the low-pressure-side side plate 18 to be connected with each other through the slits 61 to form appropriate pressure distribution around the thin plate 12 even if the shaft seal mechanism 60 is inclined to the axial direction of the rotating shaft 5 due to manufacturing errors and assembly errors in the components.

Thus, appropriate pressure distribution can be maintained around the thin plate 12 even if the shaft seal mechanism 60 is inclined to the axial direction of the rotating shaft 5 due to manufacturing errors and assembly errors in the components. This allows the thin plate 12 to be prevented from being worn away as a result of possible disturbance of the pressure distribution around the thin plate 12.

Fifth Embodiment

A shaft seal mechanism according to a fifth embodiment of the present invention will be described with reference to FIG. 8.

Figure 8:
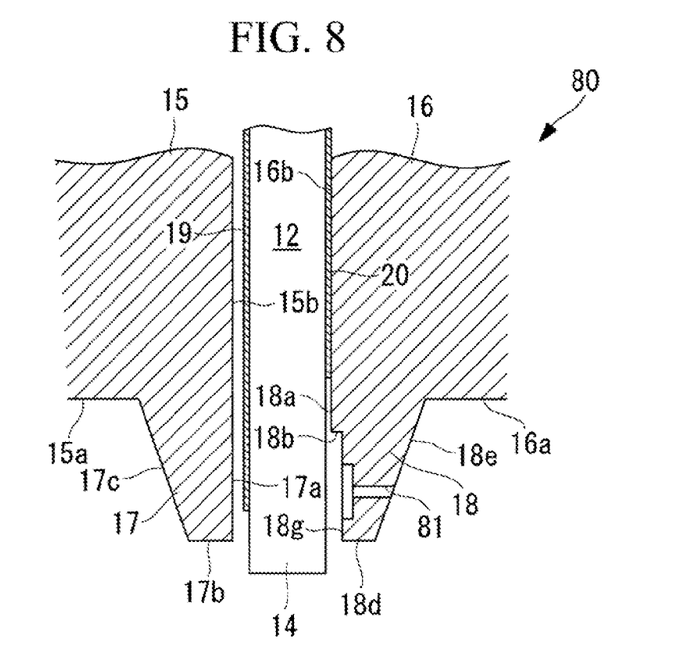
FIG. 8 is a cross-sectional view showing an important part of a shaft seal mechanism according to a fifth embodiment of the present invention, and is similar to FIG. 2.

FIG. 8 is an enlarged cross-sectional view of an important part of the shaft seal mechanism according to the present embodiment, and is similar to FIG. 2.

As shown in FIG. 8, a shaft seal mechanism 80 according to the present embodiment is different from the shaft seal mechanism according to the above-described fourth embodiment in that, instead of the slits 61, a plurality of communication holes (balance holes) 81 allowing the inner wall surface 18g and the outer wall surface 18e to be connected with each other are formed along the circumferential direction and axial direction of the rotating shaft 5. The other components of the shaft seal mechanism 80 are the same as the corresponding components of the above-described fourth embodiment and will thus not be described below.

The same components of the shaft seal mechanism 80 as the corresponding components of the above-described fourth embodiment are denoted by the same reference numerals and will not be described below.

The shaft seal mechanism 80 according to the present embodiment allows the inner wall surface 18g of the low-pressure-side side plate 18 and the outer wall surface 18e of the low-pressure-side side plate 18 to be connected with each other through the communication holes 81 to form appropriate pressure distribution around the thin plate 12 even if the shaft seal mechanism 80 is inclined to the axial direction of the rotating shaft 5 due to manufacturing errors and assembly errors in the components.

Thus, appropriate pressure distribution can be maintained around the thin plate 12 even if the shaft seal mechanism 80 is inclined to the axial direction of the rotating shaft 5 due to manufacturing errors and assembly errors in the components. This allows the thin plate 12 to be prevented from being worn away as a result of possible disturbance of the pressure distribution around the thin plate 12.

Sixth Embodiment

A shaft seal mechanism according to a sixth embodiment of the present invention will be described with reference to FIG. 9.

Figure 9:
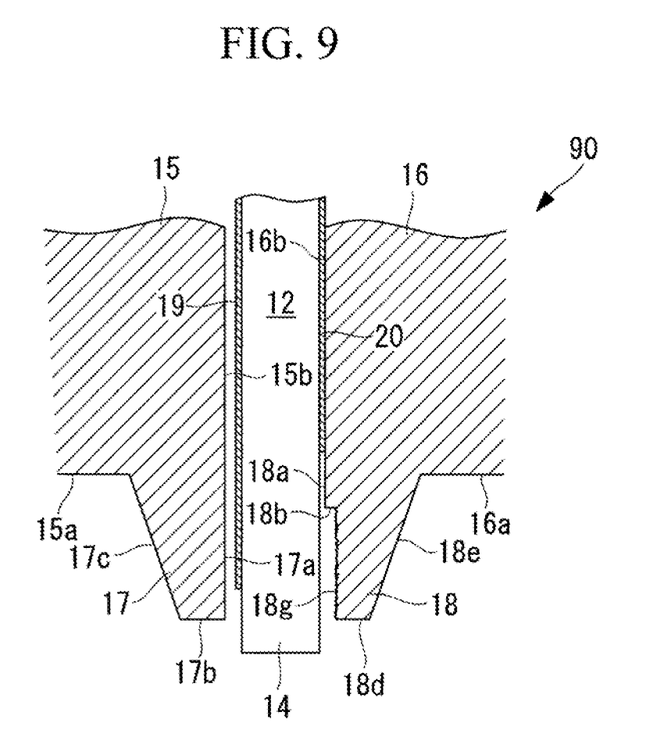
FIG. 9 is a cross-sectional view showing an important part of a shaft seal mechanism according to a sixth embodiment of the present invention, and is similar to FIG. 2.

FIG. 9 is an enlarged cross-sectional view of an important part of the shaft seal mechanism according to the present embodiment, and is similar to FIG. 2.

As shown in FIG. 9, a shaft seal mechanism 90 according to the present embodiment is different from the shaft seal mechanisms according to the fourth embodiment and the fifth embodiment in that, instead of the formation of the slits 61 and the communication holes 81, processing of the surface of the inner wall surface 18g is carried out such that the surface has increased surface roughness. The other components of the shaft seal mechanism 90 are the same as the corresponding components of the above-described fourth embodiment and fifth embodiment and will thus not be described below.

The same components of the shaft seal mechanism 90 as the corresponding components of the above-described fourth embodiment and fifth embodiment are denoted by the same reference numerals and will not be described below.

The shaft seal mechanism 90 according to the present embodiment allows an appropriate gap (low-pressure-side gap) to be formed between the low-pressure-side side plate 18 and the thin plate 12 even if the shaft seal mechanism 90 is inclined to the axial direction of the rotating shaft 5 due to manufacturing errors and assembly errors in the components.

Thus, appropriate pressure distribution can be maintained around the thin plate 12 even if the shaft seal mechanism 90 is inclined to the axial direction of the rotating shaft 5 due to manufacturing errors and assembly errors in the components. This allows the thin plate 12 to be prevented from being worn away as a result of possible disturbance of the pressure distribution around the thin plate 12.

Furthermore, the turbine 4 according to the present invention includes the shaft seal mechanism 10, 40, 50, 60, 80, or 90 that can maintain appropriate pressure distribution around the thin plate 12 even if the shaft seal mechanism 10, 40, 50, 60, 80, or 90 is inclined to the axial direction of the rotating shaft 5 due to manufacturing errors and assembly errors in the components, allowing the thin plate 12 to be prevented from being worn away as a result of possible disturbance of the pressure distribution around the thin plate 12.

This enables the amount of leaking gas to be kept small over a long time and thus enables to reduce loss of driving force caused by gas leakage.

The followings are determined taking into account manufacturing errors and assembly errors in the components forming the shaft seal mechanism 10, 40, 50, 60, 80, and 90: the gap between the thin plate 12 and the low-pressure-side side plate 18, the diameters and numbers of the communication holes 51 and 81, the size and number of the slits 61, and the surface roughness of the inner wall surface 18g.

Furthermore, the present invention is not limited to the above-described embodiments. The embodiments may be modified or changed as necessary and as appropriate.

REFERENCE SIGNS LIST

4 Turbine
5 Rotating shaft
5a Circumferential surface
8 Vane (stationary portion)
10 Shaft seal mechanism
11 Leaf seal housing
12 Thin plate
13 Outer circumferential base end
14 Inner circumferential leading end 17 High-pressure-side side plate
18 Low-pressure-side side plate
18c Inner wall surface
18d Inner circumferential surface
18e Outer wall surface
18f Curved surface
18g Inner wall surface
40 Shaft seal mechanism
50 Shaft seal mechanism
51 Communication hole
60 Shaft seal mechanism
61 Slit
80 Shaft seal mechanism
81 Communication hole
90 Shaft seal mechanism

The invention claimed is:

1. A shaft seal mechanism blocking fluid flow through an annular space between a rotating shaft and a stationary portion in an axial direction of the rotating shaft, the shaft seal mechanism comprising: a leaf seal housing held inside the stationary portion; a plurality of thin plates provided in a circumferential direction of the rotating shaft with gaps formed between the plurality of thin plates, wherein each of the plurality of thin plates comprises an outer circumferential base end fixed in the leaf seal housing and an inner circumferential leading end subtending an acute angle to a circumferential surface of the rotating shaft, the plurality of thin plates having a width in the axial direction of the rotating shaft and contacting the circumferential surface of the rotating shaft in a slidable manner; and a low-pressure-side side plate and a high-pressure-side side plate provided on a low pressure side and a high pressure side, respectively, of the leaf seal housing, sandwiching each of the plurality of thin plates between the side plates, wherein the low-pressure-side side plate comprises a first inner circumferential surface and a second inner circumferential surface extending along the axial direction of the rotating shaft and an inner wall surface of the low-pressure-side side plate that connects the first inner circumferential surface and the second inner circumferential surface and that is opposite to a lateral surface of the plurality of thin plates, wherein the inner wall surface is formed along a direction crossing the axial direction of the rotating shaft such that a gap between the inner wall surface and the plurality of thin plates gradually decreases from an end at a radially inner side of the low-pressure-side side plate that is connected to the second inner circumferential surface through an end at a radially outer side of the low-pressure-side side plate that is connected to the first inner circumferential surface; wherein the low-pressure-side side plate further comprises an outer wall surface that connects the second inner circumferential surface and the leaf seal housing, and wherein the outer wall surface extends along a direction crossing the axial direction of the rotating shaft such that a thickness of the low-pressure-side side plate gradually increases from an end connected to the second inner circumferential surface through an end connected to the leaf seal housing.

2. The shaft seal mechanism according to claim 1, wherein the inner wall surface of the low-pressure-side side plate and the outer wall surface of the low-pressure-side side plate are arranged along the circumferential direction of the rotating shaft and are connected with each other through a communication hole extending along the axial direction of the rotating shaft.

3. A turbine comprising the shaft seal mechanism according to claim 2, wherein the turbine transduces thermal energy of fluid into mechanical rotational energy to generate power by guiding the fluid at elevated temperature and pressure to a casing to blow the fluid against a blade on a rotating shaft rotatably supported inside the casing.

4. A turbine comprising the shaft seal mechanism according to claim 1, wherein the turbine transduces thermal energy of fluid into mechanical rotational energy to generate power by guiding the fluid at elevated temperature and pressure to a casing to blow the fluid against a blade on a rotating shaft rotatably supported inside the casing.

5. The shaft seal mechanism according to claim 1, wherein the inner wall surface, the second inner circumferential surface, and the outer wall surface form a shape appearing like a wedge in a cross-sectional view.

6. A shaft seal mechanism blocking fluid flow through an annular space between a rotating shaft and a stationary portion in an axial direction of the rotating shaft, the shaft seal mechanism comprising: a leaf seal housing held inside the stationary portion; a plurality of thin plates provided in a circumferential direction of the rotating shaft with gaps formed between the plurality of thin plates, wherein each of the thin plates comprises an outer circumferential base end fixed in the leaf seal housing and an inner circumferential leading end subtending an acute angle to a circumferential surface of the rotating shaft, the plurality of thin plates having a width in the axial direction of the rotating shaft and contacting the circumferential surface of the rotating shaft in a slidable manner; and a low-pressure-side side plate and a high-pressure-side side plate provided on a low pressure side and a high pressure side, respectively, of the leaf seal housing, sandwiching each of the plurality of thin plates between the side plates, wherein the low-pressure-side side plate comprises a first inner circumferential surface extending along the axial direction of the rotating shaft, a rounded curved surface projecting toward the inner circumferential leading end of the plurality of thin plates, and an inner wall surface of the low-pressure-side side plate that connects the first inner circumferential surface and the rounded curved surface and that is opposite to a lateral surface of the plurality of thin plates, wherein the inner wall surface is formed along a direction crossing the axial direction of the rotating shaft such that a gap between the inner wall surface and the plurality of thin plates gradually decreases from an end at a radially inner side of the low-pressure-side side plate that is connected to the rounded curved surface through an end at a radially outer side of the low-pressure side plate that is connected to the first inner circumferential surface, wherein the low-pressure-side side plate further comprises an outer wall surface that connects the rounded curved surface and the leaf seal housing, wherein the inner wall surface of the low-pressure-side side plate and the outer wall surface of the low-pressure-side side plate are connected together by the rounded curved surface, and wherein the outer wall surface extends along a direction crossing the axial direction of the rotating shaft such that a thickness of the low-pressure-side side plate gradually increases from an end connected to the rounded curved surface through an end connected to the leaf seal housing.

7. The shaft seal mechanism according to claim 6, wherein the inner wall surface of the low-pressure-side side plate and the outer wall surface of the low-pressure-side side plate are arranged along the circumferential direction of the rotating shaft and are connected with each other through a communication hole extending along the axial direction of the rotating shaft.

8. A turbine comprising the shaft seal mechanism according to claim 7, wherein the turbine transduces thermal energy of fluid into mechanical rotational energy to generate power by guiding the fluid at elevated temperature and pressure to a casing to blow the fluid against a blade on a rotating shaft rotatably supported inside the casing.

9. A turbine comprising the shaft seal mechanism according to claim 6, wherein the turbine transduces thermal energy of fluid into mechanical rotational energy to generate power by guiding the fluid at elevated temperature and pressure to a casing to blow the fluid against a blade on a rotating shaft rotatably supported inside the casing.

* * * * *